United States Patent
Pham et al.

(10) Patent No.: US 10,075,393 B2
(45) Date of Patent: *Sep. 11, 2018

(54) PACKET ROUTING USING A SOFTWARE-DEFINED NETWORKING (SDN) SWITCH

(71) Applicant: Fortinet, Inc., Sunnyvale, CA (US)

(72) Inventors: Son Pham, San Jose, CA (US); Donald Krall, San Jose, CA (US); Venkateswara Adusumilli, San Jose, CA (US); Edward Lopez, South Riding, VA (US); Neil Huynh, Fremont, CA (US)

(73) Assignee: Fortinet, Inc., Sunnyvale, CA (US)

( * ) Notice: Subject to any disclaimer, the term of this patent is extended or adjusted under 35 U.S.C. 154(b) by 172 days.

This patent is subject to a terminal disclaimer.

(21) Appl. No.: 14/985,819

(22) Filed: Dec. 31, 2015

(65) Prior Publication Data

US 2017/0195255 A1    Jul. 6, 2017

(51) Int. Cl.
| H04L 12/851 | (2013.01) |
| H04L 12/947 | (2013.01) |
| H04L 12/24 | (2006.01) |
| H04L 12/46 | (2006.01) |
| H04L 12/715 | (2013.01) |

(52) U.S. Cl.
CPC .......... H04L 49/25 (2013.01); H04L 12/4633 (2013.01); H04L 41/20 (2013.01); H04L 45/64 (2013.01)

(58) Field of Classification Search
CPC ..... H04L 49/25; H04L 41/20; H04L 12/4633; H04L 45/64
See application file for complete search history.

(56) References Cited

U.S. PATENT DOCUMENTS

| 7,539,845 B1 | 5/2009 | Wentzlaff et al. |
| 9,269,439 B1 | 2/2016 | Levy et al. |
| 9,386,041 B2 * | 7/2016 | Carver ................ H04L 63/1441 |
| 9,407,549 B2 | 8/2016 | Mosko et al. |
| 9,565,135 B2 | 2/2017 | Li et al. |
| 9,565,204 B2 * | 2/2017 | Chesla .................... H04L 63/02 |

(Continued)

OTHER PUBLICATIONS

"OpenFlow Switch Specification." Open Networking Foundation. Oct. 14, 2013. 206 pgs.

(Continued)

*Primary Examiner* — Phuc Tran
(74) *Attorney, Agent, or Firm* — Hamilton, DeSanctis & Cha LLP

(57) ABSTRACT

Systems and methods for an SDN switch that facilitates forwarding/differential routing decision determination are provided. A packet is received at an input port of the SDN switch. The switch includes a first and second set of flow processing units (FPUs). The packet is forwarded to a first FPU of the first set. Based on a flow table associated with the first FPU, it is determined whether the packet is to be forwarded to a network device or an output port. The packet is received from the network device at a second FPU of the second set. Based on a flow table associated with the second FPU, it is determined whether to execute one or more instructions to forward the packet to the input or output port, or to drop or default forward the packet to the input or output port.

10 Claims, 11 Drawing Sheets

(56) References Cited

U.S. PATENT DOCUMENTS

| | | |
|---|---|---|
| 9,692,689 B2 | 6/2017 | Arumugam et al. |
| 2013/0230047 A1* | 9/2013 | Subrahmaniam ... H04L 47/2441 370/392 |
| 2014/0241356 A1 | 8/2014 | Zhang et al. |
| 2015/0026800 A1 | 1/2015 | Jain |
| 2015/0180783 A1* | 6/2015 | Crasta ............... H04L 47/2483 370/235 |
| 2016/0065452 A1* | 3/2016 | Kruglick ............ H04L 63/0263 709/221 |
| 2016/0072717 A1* | 3/2016 | Ansari .................. H04L 47/34 370/412 |
| 2016/0094449 A1* | 3/2016 | Ramia ................. H04L 45/021 370/392 |
| 2016/0094460 A1* | 3/2016 | Shelar .................. H04L 45/56 370/392 |
| 2016/0182378 A1* | 6/2016 | Basavaraja .......... H04L 45/745 370/235 |
| 2016/0218973 A1* | 7/2016 | Anand ................. H04L 45/38 |
| 2016/0301603 A1* | 10/2016 | Park ..................... H04L 45/586 |
| 2016/0315880 A1* | 10/2016 | Guo ...................... H04L 43/04 |
| 2016/0330076 A1* | 11/2016 | Tiwari ................. H04L 41/0806 |
| 2016/0344590 A1* | 11/2016 | Huey ................... H04L 41/0893 |
| 2017/0019335 A1* | 1/2017 | Schultz ............... H04L 43/0876 |
| 2017/0041230 A1* | 2/2017 | Huang ................. H04L 45/745 |
| 2017/0093681 A1* | 3/2017 | Chaubey .............. H04L 43/18 |
| 2017/0149640 A1* | 5/2017 | Narayanan ........... H04L 43/062 |
| 2017/0180234 A1 | 6/2017 | Agrawal et al. |
| 2017/0195253 A1 | 7/2017 | Annaluru et al. |
| 2017/0195254 A1 | 7/2017 | Pham et al. |
| 2017/0195257 A1* | 7/2017 | Annaluru ............. H04L 49/253 |
| 2017/0195292 A1* | 7/2017 | Pham ................... H04L 63/0245 |

OTHER PUBLICATIONS

Non-Final Rejection for U.S. Appl. No. 14/985,746 dated Jul. 13, 2017.

Non-Final Rejection for U.S. Appl. No. 14/985,783 dated Oct. 6, 2017.

Non-Final Rejection for U.S. Appl. No. 14/985,827 dated Oct. 6, 2017.

* cited by examiner

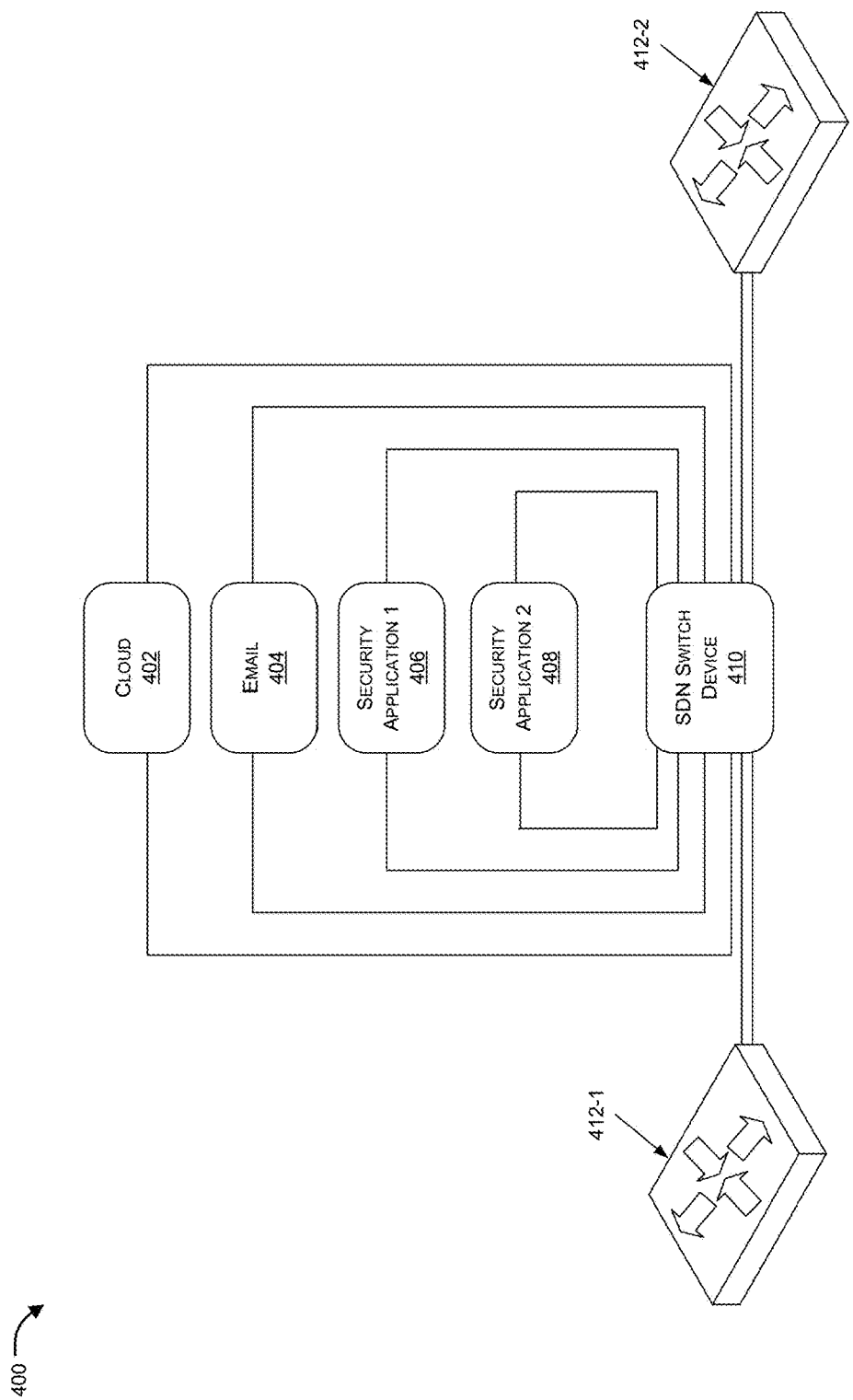

PACKET ROUTING USING A SOFTWARE-DEFINED NETWORKING (SDN) SWITCH

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2015, Fortinet, Inc.

BACKGROUND

Field

Embodiments of the present invention generally relate to software-defined networking (SDN). In particular, embodiments of the present invention relate to routing and packet flow control of packets by an SDN switch.

Description of the Related Art

Global Internet Protocol (IP) traffic has increased fivefold in the last five years, and is expected to increase another threefold over the next five years. As the number of mobile devices and other IP devices connecting to the Internet are growing very rapidly, data traffic that needs to be monitored and inspected by network security devices is also increasing. Such increasing data traffic from different types of devices is creating new vulnerabilities that need to be monitored/inspected and controlled by the network security devices. As new types of network security issues are emerging, the network security devices need to include new policy rules to monitor and control the data traffic to/from a secured network. It is becoming difficult for hardware based switches or network security devices to provide the required scalability for rapidly increasing data traffic and increasing policy rules. To overcome the limitations of the hardware based switches or network security devices, which lack the flexibility of incorporating new and different forwarding rules, SDN devices that allow updates at regular intervals have been proposed for providing scalable and fast processing of network packets. With such features, typical SDN devices, e.g., SDN switches, are moving to replace, and are being configured to work in conjunction with traditional routers and switches in several high end applications, including the emerging cloud and datacenter environments where high volumes of traffic need to be monitored and filtered. SDN is an approach to computer networking that allows network administrators to manage network services through abstraction of lower-level functionality. This is done by decoupling the operating system that makes decisions about where the traffic is sent (the control plane) from the underlying hardware systems that forward traffic to the selected destinations (the data plane).

One aspect of SDN is the separation or abstraction of the control plane from the data plane. A typical enterprise network device may have a controlling element and a forwarding element within the same box that implements the SDN features. The forwarding elements are configured to receive packets, do conversion(s) if required, and forward the packets to their respective destinations based on instructions received from the controlling elements. In implementation, forwarding elements (also referred to as the data plane) receive forwarding commands from the control plane, based on which instructions the forwarding elements (also referred to as the controller) make/take a forwarding decision to be implemented in the data plane. The control plane is typically a collection of software running within a router or within a switch that uses rules that are set to identify the packet received from traffic, decide appropriate actions to be taken on the packet, and conveys the control decision to the data plane such that the data plane knows where to forward the packet(s).

To allow communications between different network devices or SDN devices, the OpenFlow protocols, including but not limited to Open Networking Foundation (ONF), "OpenFlow Switch Specification" Version 1.5.0 (Protocol version 0x06), Dec. 19, 2014 (hereafter, the "OpenFlow Protocol"), which is hereby incorporated by reference in its entirety for all purposes, are now being used. The OpenFlow Protocol intends to provide access to the data plane of a network device or an SDN device to other network devices and SDN devices, in addition to providing a protocol for device configuration. The OpenFlow Protocol was defined to increase flexibility and programmability of networks/network devices in order to allow network administrators to more easily tailor network configurations to their needs. The OpenFlow Protocol requires an SDN switch to contain a series of associative flow tables. Each entry in a table may contain ternary values for a desired selection of packet fields (e.g., Media Access Control (MAC) source and destination addresses, IP source and destination addresses, Transmission Control Prototype (TCP) port numbers, and the like). The OpenFlow Protocol defines a number of standardized packet header fields for matching as well as allowing users to add their own custom fields. Table entries are in prioritized order, and for each individual packet processed by the SDN switch, the table entries are searched in order for a matching entry. The table entries can have ternary values to match a broad selection of packets, wherein when the first matching table entry is found within the flow table, a set of actions associated with the matching flow table entry is executed. This may modify fields of the packet, for example, by setting the MAC destination field to a new value, the tables may direct an SDN switch to output the packet to a particular switch port in a particular queue, or send it to an SDN software controller, or to drop the packet. It is generally intended that when the existing flow tables do not contain a matching flow table entry, the packet is sent to the controller, which may respond by installing rules within the switch to properly process subsequently received similar packets. This accomplishes the goal of control plane and data plane separation by having the SDN controller software make the decisions concerning what flow tables are to be installed, whereas the SDN switch simply follows the directives of the SDN controller instead of making complex behavioral decisions on its own. In general, existing SDN switches are configured to be able to flexibly match against packets, and directed by the matches, perform a comprehensive set of actions to modify the packet and decide what to do with it.

SDN architectures that use Openflow protocol specification provide a high degree of dynamic flexibility to define new rules to be used, and actions to be taken by the network security devices. SDN architectures that use OpenFlow protocol lead to adaptation of more flexible system hardware architecture and implementation to enable quick turnkey solutions for concurrent deployment of various types of network applications.

SDNs that use the OpenFlow Protocols provide a high degree of dynamic flexibility to define new rules to be used, and actions to be taken by the network security devices. SDN architectures that use the OpenFlow Protocol therefore leads to adaptation of more flexible system hardware architecture and implementation to enable quick turnkey solution (s) for concurrent deployment of various types of network applications. Flexibility is also required in terms of traffic volume that the SDN controller and attached SDN switches can handle. Dataflow in a network may be related/associated with different types of applications, and therefore data flow packets need different treatment by the SDN switches and/or by network security devices. Therefore, there is a need for an SDN switch that can operate in a transect forwarding mode as well as a differential routing mode to transfer a packet either to a security device/network device or to a destination device.

SUMMARY

Systems and methods are described for an SDN switch that facilitates forwarding/differential routing decision determination. Embodiments of the present disclosure generally relate to a software-defined network (SDN). In particular, embodiments of the present disclosure relate to routing and packet flow control of packets by an SDN switch. A packet is received by a software defined networking (SDN) switch at an input port of the SDN switch. The SDN switch includes a first set of flow processing units (FPUs) and a second set of FPUs. The packet is forwarded by the SDN switch to a first FPU selected from the first set of FPUs. It is determined by the first FPU, based on matching of the packet with respect to a flow table associated with the first FPU, whether to forward the packet to a network device or to forward the packet to an output port of the SDN switch. The packet is received from the network device at a second FPU that is selected from the second set of FPUs. It is determined by the second FPU, based on matching of the packet with respect to a flow table associated with the second FPU, whether to execute one or more instructions to forward the packet to the input port or the output port, or to drop or default forward the packet to the input port or the output port.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIGS. 4A and 4B illustrate exemplary SDN switch devices configured to provide transect and differential mode of operation in accordance with various embodiments of the present invention.

DETAILED DESCRIPTION

Figure 1A:
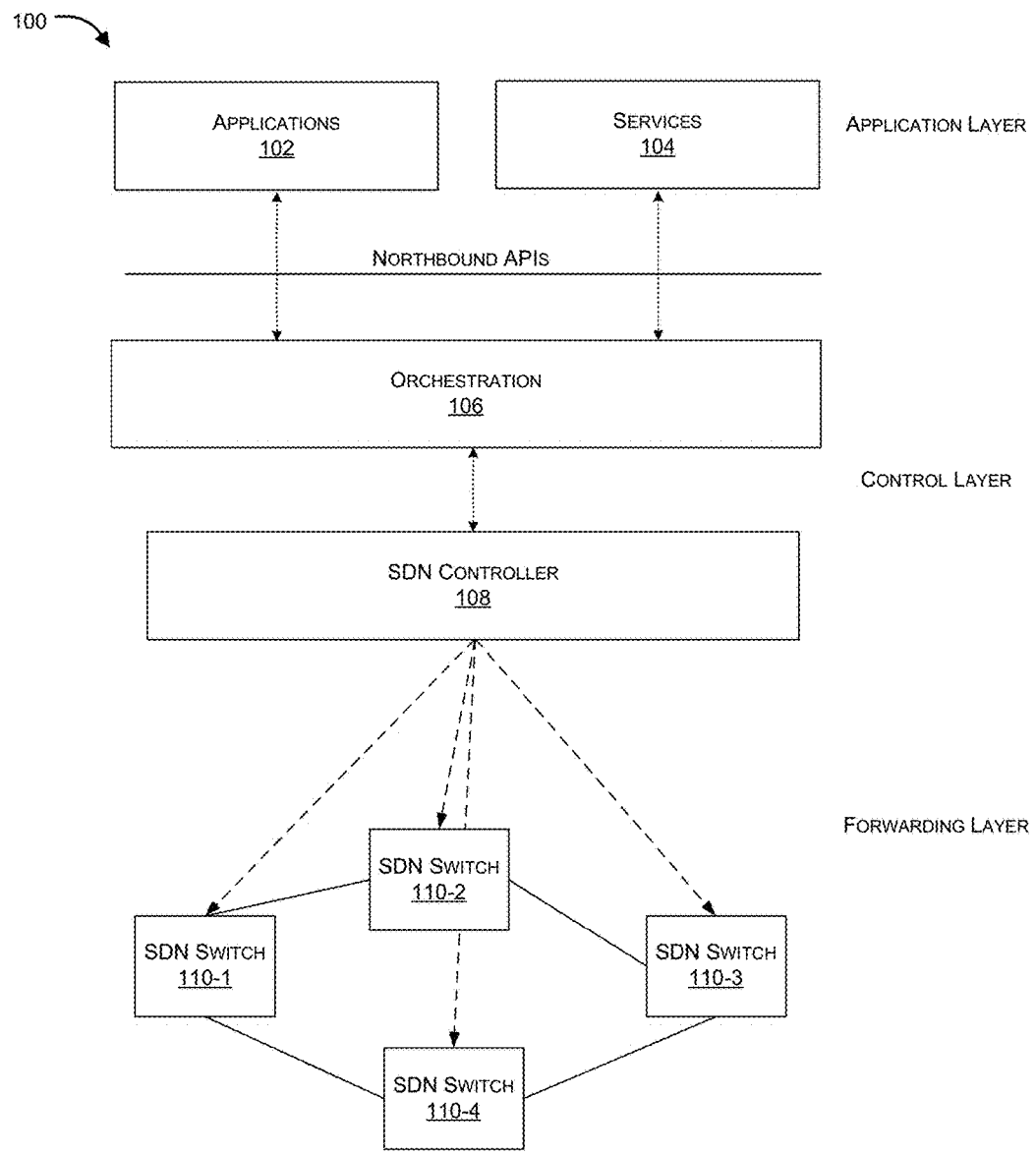
FIG. 1A illustrates an exemplary SDN architecture designed in accordance with an embodiment of the present disclosure.

Systems and methods are described for an SDN switch that facilitates forwarding/differential routing decision determination. Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with reference to routing packets in an SDN architecture, it should be appreciated that the same has been done merely to illustrate the disclosure in an exemplary manner and any other purpose or function for which the explained structure or configuration can be used, is covered within the scope of the present disclosure.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

Embodiments of the present disclosure generally relate to software-defined networking (SDN). In particular, embodiments of the present disclosure relate to routing and packet flow control of packets by an SDN switch.

In an aspect, an SDN switch include a packet receive module that can be configured to receive a packet at an input port. The SDN switch can include a first set of flow processing units and a second set of flow processing units. The SDN switch can further include a packet forwarding module that can be configured to forward the received packet to a first flow processing unit selected from the first set of flow processing units. The SDN switch can further include a first set of flow processing units based packet processing module that can be configured to, based on matching of the packet with respect to a flow table of the first flow processing unit, decide whether to forward the packet to a network device or to forward the packet to an output port. The SDN switch can further include a second set of flow processing units based packet processing module that can be configured to receive the packet at a second flow processing unit that is selected from the second set of flow processing units and, based on matching of the packet with respect to flow table of the second flow processing unit, decide whether to execute one or more instructions to forward the packet to the input/output port, or to drop/default forward the packet to the input/output port.

Embodiments of the present disclosure provide a software-defined networking (SDN) device, particularly an SDN switch, that can be configured to support multiple modes of operation, including, but not limited to, a transect mode and a differential routing mode. As those skilled in the art will appreciate, the SDN switch can be implemented within an existing network security device and can be configured to include multiple interfaces connected to different types of network devices such as web servers, email servers, or network security devices, which perform security or application-level operations. In an exemplary implementation, for enabling transect mode, also referred to as Link Transection, the SDN switch device can be placed in the path between two active networking devices, wherein the link directed between these two active networking devices is said to be transected resulting in the Internet or public side being connected to the Northbound interface of the SDN switch, and the edge or private side being connected to the Southbound interface of the SDN switch. The SDN switch can be configured to receive packets from the Internet or public side at the northbound interface to monitor/inspect traffic directed toward the private side of the network that is connected over the southbound interface of the SDN switch. In an exemplary implementation, one or more network security devices that need to perform security operations, e.g., DDoS detection/protection, intrusion protection systems, firewalls etc. can be connected over the east or west ports of the SDN switch device.

In an aspect, for enabling differential routing mode, encapsulation methods can be used to forward traffic via alternative paths when compared with techniques where results that are obtained from an IP routing table lookup based on a destination IP address of an original packet. By encapsulating the original IP packet, it is preserved for evaluation by subsequent network devices on the alternative path(s).

In an exemplary implementation, an SDN switch can be integrated with network devices such as firewalls, gateway devices, access points, intrusion prevention systems, intrusion detection systems, among other like security/application devices in order to provide network security/monitoring. Active network security devices can be path associated with the SDN switch so as to receive shunted traffic from the SDN switch and to perform any required traffic inspection, and return any forwarded traffic back to the SDN switch. It is notable that in the case of network monitoring applications, network security devices may only receive a copy of the traffic without any requirement to return traffic. In an exemplary implementation, network security devices can be configured not to alter the packet/traffic. As one may appreciate, network security devices can be configured to operate in a transparent Layer 2 mode of operation. In an exemplary implementation, the SDN switch can be configured to perform programmable flow-based shunting of traffic to the network security devices, wherein the network security devices need not be identical or uniform in nature and can be of different types. In an exemplary implementation, the network security device can be path attached to the SDN switch device so as to receive shunted traffic from the SDN switch device, perform any required traffic inspection, and return any forwarded traffic back to the SDN switch device so as to enable transect mode of operation. It is notable that in the case of network monitoring applications, the network security device may only receive a copy of the traffic without any requirement to return traffic.

In an exemplary implementation, the network can be organized by logical grouping of endpoint devices associated with a given network security device. Such groups are either defined as existing within a unique set of IP subnet values, or perhaps as traffic associated with a given Virtual Local Area Network (VLAN) based on evaluating traffic received by an SDN switch device. It can be assumed that Organizations/protected networks are defined as objects that exist on the Southbound side of the SDN switches, and that as the SDN switches evaluate traffic from Organizations flows from South-to-North, and traffic to Organizations flows from North-to-South.

In an exemplary implementation, SDN switches can have a second type of network security devices located South of the SDN switches and can be connected over the south port of the SDN switch. In an exemplary implementation, the second type of network security devices can be configured to perform differential routing by encapsulating IP traffic of interest, and forwarding it to the SDN switch. The second type of network security devices can represent a set of functional requirements necessary to classify and forward traffic of interest to the SDN switch device. As one may appreciate, the second type of network security devices may not be a specific product in and of itself (although this is a future possibility), but rather a set of requirements imposed on existing gateway devices in making traffic forwarding decisions. For example, a second type of network security device may be able to detect user/device/application information and perform policy-based traffic redirection based on those learned characteristics. However, it can be assumed that the second type of network security devices will direct traffic to the SDN switch device based on path selection and/or traffic encapsulation to preserve the original packets in addition to the Network Address Translation (NAT) functions performed by the second type of network security devices presently. In an aspect, traffic from second type of network security devices to the SDN switch can be termed as 'differential routing', which indicates that the traffic is being forwarded based on packet-characteristics rather than on the use of a MAC or IP forwarding table. In an exemplary implementation, a carrier grade networking (CGN) device can be configured to act as a routing boundary between the differential routing employed by the solution between the second type of network security device, the SDN switch device, and the traditionally routed Internet architecture.

In an exemplary implementation, an SDN switch can be configured to provide useful transparency where all traffic that previously existed on the link must be considered when flowing through the SDN switch device. The SDN switch device can be configured to provide VLAN encapsulation and support non-IP packets (e.g. control messages). In an exemplary implementation, the SDN switch device, in transect mode, can be configured to act more like a Layer 2 device and perform layer-2 mode of operation, that is in contrast to the general devices that provide differential routing and deal with IP packets and act more like a Layer 3 mode of operation. The transect mode can be intended to allow deployment of scalable network-based security and monitoring solutions at any point of the network architecture, which concept of 'network instrumentation' is key to large data center architectures FIG. 1A illustrates an exemplary SDN architecture 100 designed in accordance with an embodiment of the present invention. SDN architecture 100 can be used for service group chaining by SDN switches 110 to sequentially service two or more network security devices (not shown) by performing physical data path chaining using software defined rules and/or FPGA support logic, for example. As those skilled in the art are aware, SDN is a way to describe abstracting network functions in order to control network security functions by SDN switches 110. SDN decouples operating system functions that gather forwarding table information from forwarding hardware, and abstracts the functionality of legacy hardware into three layers (e.g., as application layer, a control layer, and a forwarding layer). The control plane applications that implement network routing and switching functionalities are completely separated from the forwarding plane, thus maintaining a centralized control plane, which enables highly customized and optimized networking services to be tailored to specific user needs or specific network environments. A centralized control plane provides a highly scalable, reliable, and flexible networking infrastructure that can cater to diverse user needs. While embodiments of the present invention are described with reference to a centralized control plane, it is specifically contemplated that a localized control plane may be used for configuring the SDN switches. In an exemplary implementation, SDN switches such as SDN switch 110-1, SDN switch 110-2, SDN switch 110-3, and SDN switch 110-4, which may be collectively and interchangeably referred to as SDN switches 110 or as OpenFlow switches 110 or simply as switches hereinafter, can be configured to use the OpenFlow Protocol as part of SDN architecture 100. In an exemplary implementation, SDN switches 110 can be programmed to define how to match packets with configured existing rules, and how to forward the packets based on one or more configurable/programmable rules. SDN switches 110 can be programmed to switch packets to/from the network security devices. In a typical implementation, when a data packet is received from real-time traffic, SDN switch 110 determines one or more pipelines to be used for forwarding the packet towards the destination. When SDN switch 110 observes an unknown flow and/or cannot determine how to forward the packet, SDN switch 110 may consult SDN controller 108 to determine what to do with the flow, and based on the configuration received from SDN controller 108, SDN switch 110 can make an appropriate decision. In general, SDN switches 110 may include multiple tables, e.g., flow tables, (not shown) for storing the rules based on which forwarding decisions are made. In an exemplary implementation, the multiple tables of SDN switches 110 can generally be stored in an appropriate data store or memory space.

In an exemplary implementation, the application layer can include one or more applications 102, and one or more network services 104 that can be used to determine forwarding requirements. Further, the control layer can convert the forwarding requirements/information into flow programmable statements by using Orchestration 106. On receiving the forwarding requirements/information from the upper layer, SDN controller 108 operable within the control layer can configure and program flows into the OpenFlow switches 110 using the OpenFlow Protocol.

In an exemplary aspect, virtual Border Gatewal Protocol (BGP) routing instances may run in the application layer by applications 102 or by services 104, and can dynamically modify programmed flows delivered to the OpenFlow-enabled SDN switches 110.

In an aspect, SDN architecture 100 can be used to meet the performance requirements to inspect traffic on high-performance 40 G and 100 G links beyond Layer 4. SDN architecture 100 can be configured to meet performance gate requirements of high speed network links while intelligently shunting traffic-of-interest for associated network security processing and meeting aggregate network security and performance requirements.

In an exemplary implementation, SDN controller 108 can be configured to support flow programming and provide superflow-to-flow abstraction, and other future orchestration features. SDN controller 108 can provide an ability parse a superflow into individual flows supported within the SDN appliances (e.g., SDN switches 110). In an exemplary implementation, orchestration engine 106 can implemented with SDN controller 108 or can be implemented as an independent network device. While described herein in the context of the OpenFlow Protocol, SDN architecture 100, including SDN controller 108 and SDN switches 110 may also implement the methods described herein using other ONF OpenFlow specifications, including, but not limited to any OpenFlow Switch Specification having version 1.3 or greater.

In an exemplary implementation, SDN controller 108 can configure one or more SDN switches 110 to operate in transecting mode and differential routing mode for forwarding packets received from/to network devices and/or port. SDN switches 110 can be configured with rules to conditionally forward the received packets. Each SDN switch 110 can be configured to include multiple flow processing units (FPUs) that enable operation in transect mode and/or differential routing mode. Although various examples described herein may be described with respect to a particular number of FPUs, more or fewer may be used depending upon the needs of the particular implementation.

In an exemplary implementation, SDN switch 110 may have multiple flow processing units that can broadly be classified into two categories/types, a first category/type that can be configured to store flow tables to enable forwarding of packets to/toward appropriate security devices or network devices, and a second category/type that can be configured to store flow tables to enable forwarding of packets to/toward output port(s) of the switch or dropping of the packets.

Once configured, SDN switches 110 can receive a packet at an ingress port, and can forward the packet to a first flow processing unit that is selected from the first category/type of flow processing unit. The first processing unit of SDN switch 110 can decide whether to forward the packet to a network device or to forward the packet to an output port, which decision can be made based on matching of the packet (e.g., fields/attributes of the packet header) with respect to a flow table stored in a memory device associated with the first processing unit of SDN switch 110. The first flow processing unit of SDN switch 110 can parse/examine the received packet based on one or more rules defined by SDN controller 108 to forward the packet conditionally to a first security device for service (e.g., performing one or more security checks) or to a network device for forwarding the packet towards its destination or simply to process the packet. In an aspect, upon receiving the packet, the first security/network device can examine the packet to either drop the packet or forward it to an egress port, or to forward the received packet to a second flow processing unit that can be selected from the second category/type of flow processing unit of the SDN switch 110. The second flow processing unit of SDN switch 110 can examine the received packet, and decide whether to execute one or more instructions or to forward the packet towards an appropriate I/O port based on matching of the attributes of the received packet with the attributes of flow tables associated with the second flow processing unit.

Figure 1B:
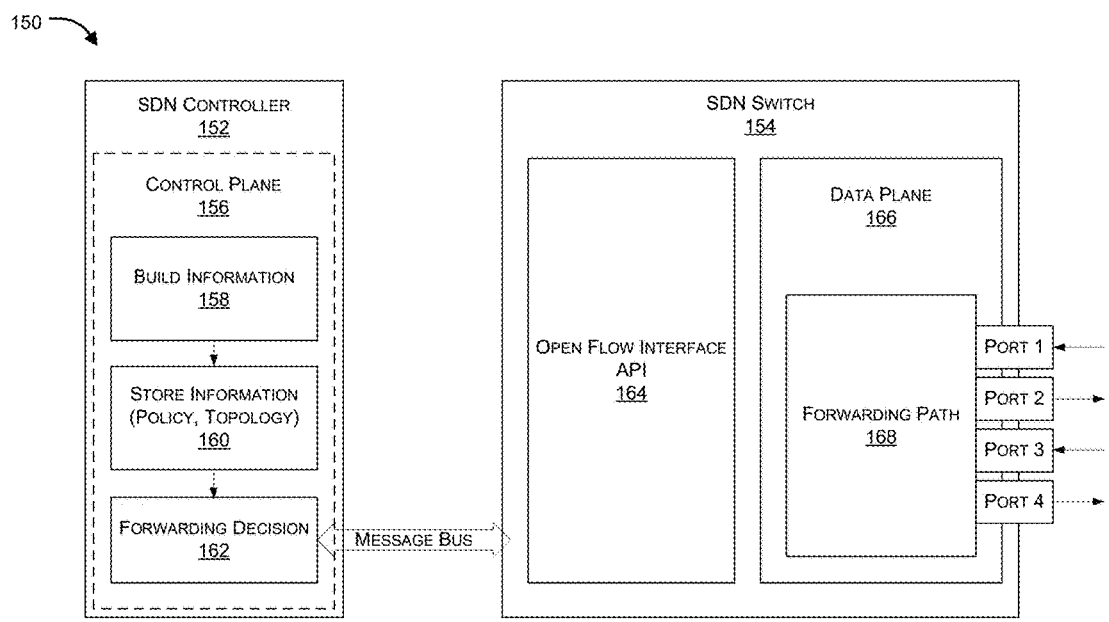
FIG. 1B illustrates an exemplary flexible data plane and control plane configuration of an SDN architecture that uses the OpenFlow Protocol in accordance with an embodiment of the present disclosure.

FIG. 1B illustrates an exemplary flexible data plane and control plane configuration of an SDN that uses the OpenFlow Protocol in accordance with an embodiment of the present invention. Different functionalities (e.g., rule/information building, storage of policy or network topology (in the case of a topology aware network), forwarding decision etc.) can be separated and assigned to either SDN controller 152 or SDN switch 154. In an exemplary implementation, a control plane 156 and a data plane 166 of the system can be separated so as to achieve a high level of scalability. Though there are different possible implementations in which different functions can be assigned either to SDN controller 152 or to SDN switch 154, in an exemplary implementation, all activities that are necessary to exeuction of data plane functions but do not involve transecting end-user data packets, making routing tables, setting packet handling policies, base station beacons announcing availability of services and the like, can be configured to be part of control plane 158, and all activities involving as well as resulting from data packets originated by client devices, including forwarding, fragmentation and reassembly, replication for multicasting and the like, can be configured in/for data plane 166.

As those skilled in the art will will appreciate, the basic job of an SDN switch is to make forwarding decisions, which is considered to be a control plane activity, and subsequently forward the packet at issue toward its destination, which is considered to be a data plane activity. In an exemplary implementation, it is possible to configure SDN switches 154 to perform some control plane activities, particularly the forwarding decisions, in addition to performing data plane activities. However, in a specific implementation, activities of control plane 156, which include building information 158, store information 160, and making forwarding decisions 162 can be performed by SDN controller 152, and activities of data plane 166, which include assigning forwarding path 168 to packets can be performed by SDN switch 154. SDN switches that receive forwarding decisions from SDN controller 152 are generally referred to as externally controlled switches. In an exemplary implementation, forwarding decisions can be conveyed by SDN controller 152 to SDN switch 154 through a message bus. SDN switch 154 can be configured to provide an OpenFlow interface API 164, using which SDN controller 152 can track the status of SDN switch 154 and can communicate with SDN switch 154. Given that OpenFlow removes control plane responsibilities from SDN switch 154, it also removes scaling problems along with it, and shifts the burden upstream to a more scalable and centralized OpenFlow SDN controller 152. When controlled via the OpenFlow Protocol, SDN switch 154 itself may no longer have to make forwarding decisions, and therefore no longer needs to maintain information required to facilitate those decisions, and no longer needs to run processes required to build and maintain that information. All of that responsibility can be performed by SDN controller 152.

In an exemplary deployment model, service functions such as service function chaining, data path chaining, among others can be inserted on the data-forwarding path 168 between communicating peers. However, in alternative deployments, service functions, whether physical or virtualized, may reside on direct data forwarding path 168 and traffic can instead be steered through required service functions wherever they are deployed.

As those skilled in the art will appreciate, in different implementations, SDN controller 152 or SDN switch 154 can be configured to make forwarding decisions using preconfigured rule sets, which may be stored in flow tables. In an exemplary implementation, to make a forwarding decision, SDN controller 152 or SDN switch 154 can use flow tables stored within them. In an exemplary implementation, forwarding decisions can be made by SDN switch 154, and hence SDN switch 154 may store flow tables having multiple fields and entries. SDN switch 154 may store the forwarding information, which is generally stored in the form of OpenFlow flow tables, in specialized memory resources (e.g., Ternary-Content-Addressable Memory (TCAM) or Dynamic Random Access Memory (DRAM))

for making fast and efficient decisions. Sometimes, storing large forwarding information within SDN switch 154 may not be possible as specialized memories are generally costly, in which cases, the forwarding information can be stored with SDN controller 152 and the decisions can be made by SDN controller 152. The forwarding information can therefore be stored in the form of flow tables, either in SDN controller 152 or in SDN switch 154 depending on the particular implementation.

Figure 1C:
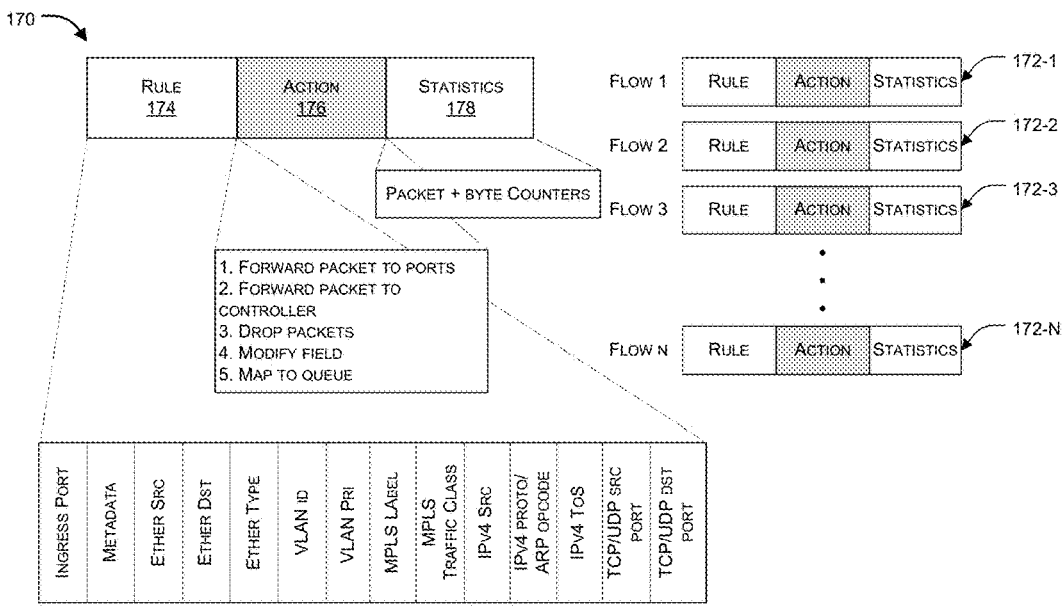
FIG. 1C illustrates exemplary flow table fields that can be used by SDN switches in accordance with an embodiment of the present disclosure.

FIG. 1C illustrates exemplary open flow table fields that can be used by the SDN switches in accordance with an embodiment of the present disclosure. In an exemplary implementation, data flow for the SDN can be defined and configured by SDN controller. Data flows/flow paths can be configured at SDN switches to store data flow information, also referred as forwarding information, in the form of open-flow tables at the SDN switches. Incoming packets can be matched against flow definitions/forwarding rules and, in case of a match, a set of actions can be performed, and statistics 178 can be updated. Packets that do not match any flow-table entry can be (typically) encapsulated and sent to SDN controller. The SDN controller decides the way to process the packet and accordingly adds a new rule in the data plane flow-table 170. The exemplary open-flow table 170 can be configured to be stored in high speed data plane at an open-flow SDN switch, and may contain plurality of configurable entries/rules. Successive packets with the same flow identifier can be processed according to this new rule without contacting the SDN controller. Therefore, while each packet is switched individually, the flow can be the basic unit of manipulation within the OpenFlow enabled switch.

In an exemplary implementation, flow table 170 may have different fields, such as header, action, and statistics. The header field of flow table 170 may include check points/rules that are to be used for matching the details of received packets and the action fields contain the action(s) to be taken on the packet if a match is found. Fields of flow table 170 can be broadly classified as rule fields 174, action fields 176 and statistics 178. Rule fileds 174 store the rules or parameters that can be used to identify appropriate entries in flow table 170 for the received packet header. Rules 174 are mostly defined based on header details of the packet, and may be a combination of one or more of ingress port, metadata, Ether source, Ether destination, Ether type, Virtual Local Area Network (VLAN) identifier (ID), VLAN Pri, Multiprotocol Label Switching (MPLS) label, MPLS traffic class, Internet Protocol version 4 (IPv4) source, IPv4 protocol and/or Address Resolution Protocol (ARP) OP code(s), Transmission Control Protocol (TCP)/User Datagram Protocol (UDP) source port, TCP/UDP destination port, among other fields of the packet header. Flow table 170 may include several entries representing different data flows, for example, flow 1 172-1, flow 2 172-2, flow-3 172-3, and flow N 172-N, which may be collectively and interchangeably referred to as data flow entries 172. Data flow entries 172 can be made in flow table 170 by SDN controller, and can be stored in one or more TCAMs and/or DRAMs of SDN switch(es). Each data flow entry 172 can include the rules 174 to be used for matching incoming data packets, actions 176 to be taken if the match is found, and statistics 178. For example, all packets that are addressed to a particular IP address and to a TCP/UDP port (i.e., web traffic) may define a particular flow (corresponding to a rule in flow table 170). Action 176 establishes the manner in which the packet will be processed depending on the rule 174.

In an exemplary aspect, action 176 can include forwarding of packet to port(s) (defined ports), forwarding of packet to controller, dropping of packet, modification of one or more fields of packet, or mapping packet to queue for performing data path chaining. In an aspect, statistics 178 can gather packet related data (e.g., for use in connection with volume based billing or anti-DDoS), which can be used by network applications to make dynamic and/or automatic decisions. One potential use of statistics fieled 178 can be to establish a mechanism to set a lifetime for the flow entries. For example, duration counters can measure the amount of time that a flow has been installed in an SDN switch.

On receiving a packet, an SDN switch can try to find a match in flow table 170 using the header information of the packet, and determine an action to be taken on the received packet. The SDN switch can be configured to operate in transect mode or in differential routing mode as described in further detail below.

Figure 2:
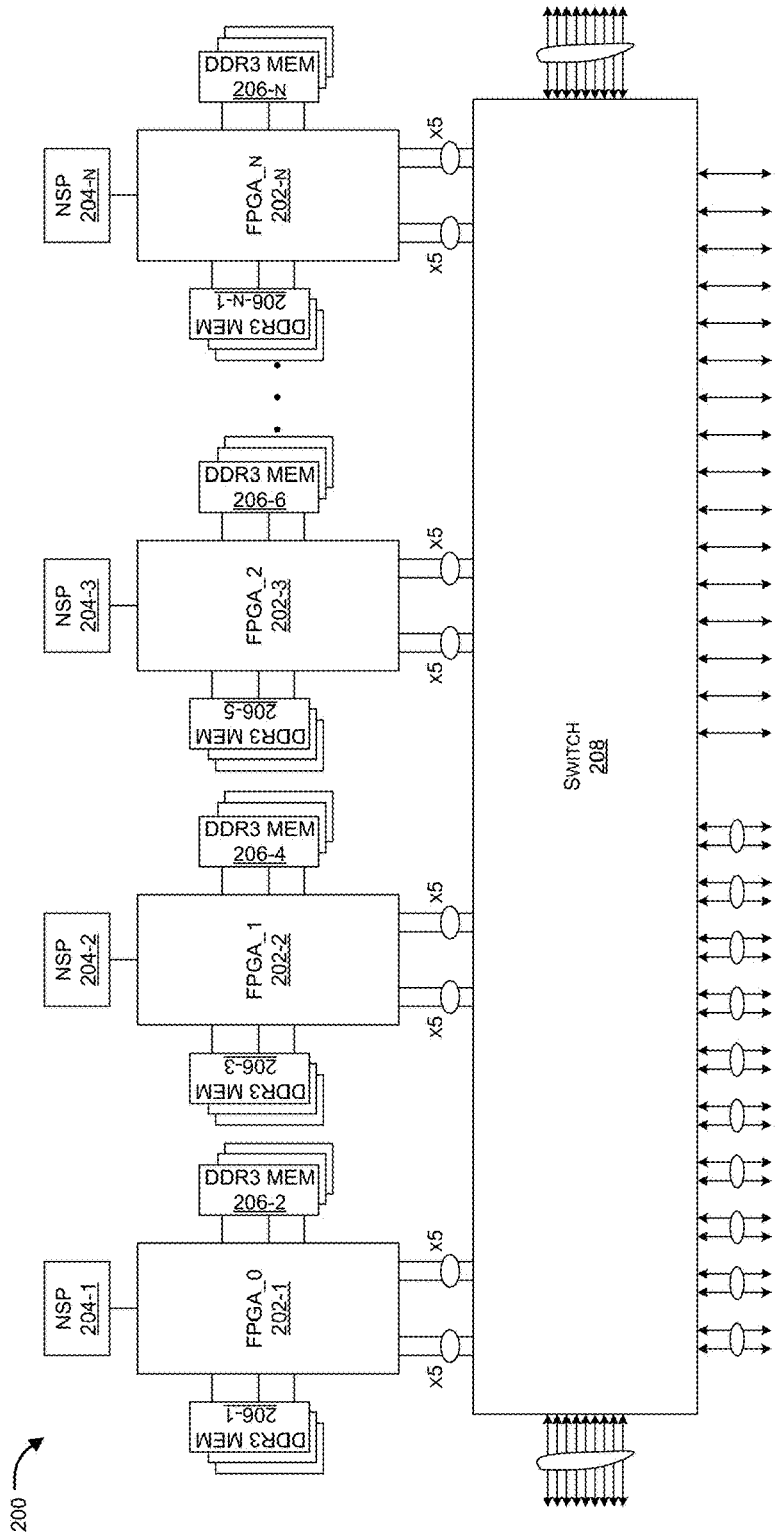
FIG. 2 illustrates an exemplary data path architecture to be used by an SDN switch in accordance with an embodiment of the present invention.

FIG. 2 illustrates an exemplary data path architecture of an SDN switch 200 in accordance with an embodiment of the present invention. In the context of the present example, SDN switch can include a switching fabric 208, ingress/egress ports, multiple FPUs such as FPGA_0 202-1, FPGA_1 202-2, FPGA_2 202-3 and FPGA N 202-N, which may be referred to interchangeably and collectively as FPU 202 or FPUs 202 hereinafter, and multiple service ports with which different service devices may be connected. In an exemplary implementation, each FPU 202 of the switch 208 can be configured to include or be operatively coupled to a set of fast memory units. For example, FPGA_0 202-1 has DDR3 memory 206-1, DDR 3 memory 206-2, and a search processor/TCAM device 204-1. According to one embodiment, search processor(s) 204 may comprise NEURON Search Processors (NSPs). NEURON is a trademark or registered trademark of Cavium of San Jose, Calif. In an exemplary implementation, each FPU 202 can have one or more flow tables that can be stored in a memory device that the FPU 202 is associated with. On receiving a packet via an ingress port, SDN switch 200 can forward the packet (via switching fabric 208) to the first FPU FPGA_0 202-1, for instance, which can process the packet with respect to its respective flow table stored in memory in order to make a forwarding decision. In an exemplary implementation, FPU 202, for example FPGAs, may have internal memory resources for storing the flow tables.

In an aspect, SDN switch 200 can include multiple (e.g., N) FPUs 202 with internal resource partitions, allowing fast implementation of different modes of operations by SDN switch 200. For instance, FPUs 202 can be configured to transect network traffic to one or more corresponding ports as defined in the flow tables, use different tunneling protocols to direct/route/terminate traffic based on actions defined in respective flow table(s), perform network monitoring features such as flow based statistics collection function, perform session tracking for conditionally forwarding traffic to security/application device(s), or perform load balancing functions. SDN switch 200 can also be configured to operate in transect mode or in differential routing mode as described further below.

Figure 3:
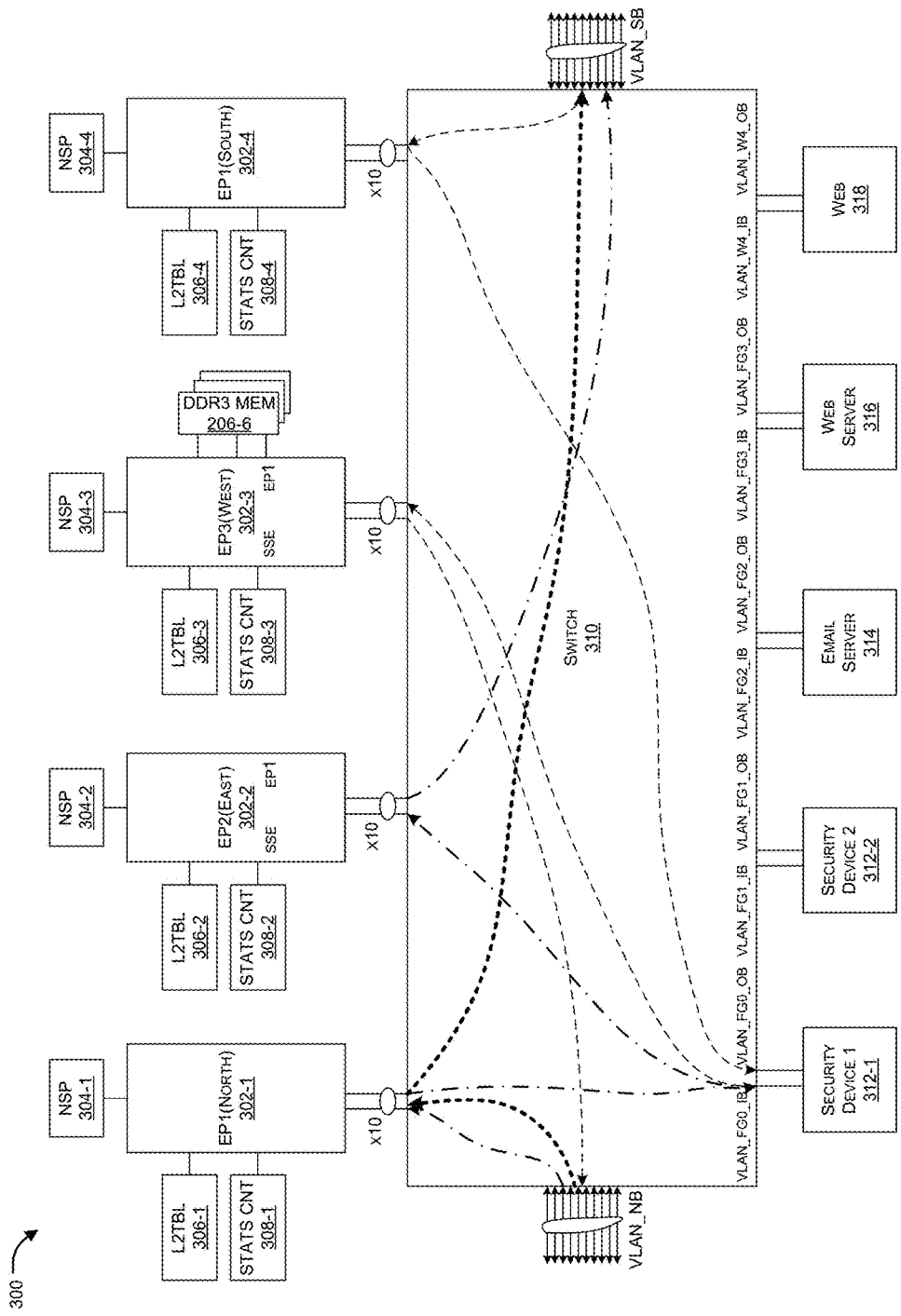
FIG. 3 illustrates an exemplary architecture of an SDN switch that is configured to perform flow processing unit based routing decisions in accordance with an embodiment of the present invention.

FIG. 3 illustrates exemplary architecture of an SDN switch 300 configured to enable transect mode and differential routing mode operation in accordance with an embodiment of the present invention. As shown in FIG. 3, in an exemplary embodiment, SDN switch 300 can include a switching fabric 310 through which the Internet or other public network is connected over north bound (NB) interface VLAN_NB, and protected network/device, which may also be referred to as private network, connected over the south bound (SB) interface VLAN_SB. In an exemplary implementation, SDN switch 300 can be operatively coupled with multiple network devices, including, but not limited to, network security devices or network devices such as security device 312-1, security device 312-2, email server 314, web server 316, and web 318, connected over the multiple interfaces/ports. In an exemplary implementation, SDN switch 300 can include multiple flow processing units such as EP1 (North) 302-1, EP2 (East) 302-2, EP2 (West) 302-3, and EP1 (South) 302-4, each of which can be configured to store/access flow information, which may also be referred to herein as forwarded rules/rules/flow paths, in an appropriate memory such as NSPs 304 that are respectively coupled to them.

In an exemplary embodiment, each flow processing unit 302 can further include or be associated/coupled with a statistics counter 308 and an L2TBL 306 for updating the counter based on one or more instructions/actions taken by the respective flow processing unit. In an exemplary implementation, SDN switch 300 can be configured between active network security devices and can be configured to enable a transect mode of operation. Those skilled in the art will appreciate that although various embodiments are explained with reference to 3 FPUs, any number of FPUs can be configured in a given SDN switch, all of which configurations are completely within the scope of the present disclosure. Similarly, although one memory device NSP 304 is being shown in the present illustration, any number of other memory devices such as TCAM devices and/or DRAM devices can be configured.

In an aspect, as can be seen, flow processing units 302-1 and 302-4 are Type 1 FPUs, and flow processing units 302-2 and 302-3 are Type 2 FPUs, wherein Type 1 (the first type/category of flow processing units) can be configured to receive packets from northbound or southbound interfaces, process the packets based on respective flow tables, and forward the packets to one or more network device such as a security device 312-1 when a match is found in the flow table; otherwise, the packets can be sent to output port. For instance, when a packet is received at VLAN_NB and it is forwarded to FPU 302-1, if EP1 (North) 302-1 does not find a match for the packet in its flow table, the packet can be sent to VLAN_SB. Similarly, when a packet is received at VLAN_SB and it is forwarded to FPU 302-4, if EP1 (South) 302-4 does not find a match for the packet in its flow table, the packet can be sent to VLAN_NB. In an implementation, when a match is not found in their respective flow tables, FPUs of the first type/category of FPUs can also drop the packet instead of default forwarding it to the output port/interface.

In another embodiment, Type 2 (the second type/category of flow processing units) can be configured to receive packets from network devices such as 312, process the packets based on respective flow tables, and either update its counters 308 and execute instructions to forward the packet to output port when a flow table match is found, or can drop/default forward the packet to the output port when no match is found. In an instance, when flow processing unit EP2 (East) 302-2 receives a packet from security device 312-1 and the packet matches a flow entry within its flow table, the EP2 (East) 302-2 can update its counters and execute instructions to send the packet to VLAN_NB; otherwise, if no match is found, the packet can either be dropped or can be default forwarded to VLAN_NB. Similarly, when flow processing unit EP2 (West) 302-3 receives a packet from security device 312-1 and the packet matches a flow table entry within its flow table, the EP2 (West) 302-3 can update its counters and execute instructions to send the packet to VLAN_SB; otherwise, if no match is found, the packet can either be dropped or can be default forwarded to VLAN_SB.

As shown in FIG. 3, a southbound packet can be received at the VLAN_NB, and can be forwarded to first flow processing unit EP1 (North) 302-1, which processing unit can parse the packet and attempt to find a match in its flow table, wherein in case a match is found, the packet can be forwarded to security device-1 312-1, wherein the security device-1 312-1, upon performing security operation, can return the packet to the SDN switch 310, which in turn can forward the packet to second flow processing unit EP2 (East) 302-2. The second flow processing unit EP2 (East) 302-2 can then forward the packet towards the VLAN_SB based on whether a match for the packet is found in its flow table. In case no match is found in the first flow processing unit EP1 (North) 302-1, SDN switch 310 can directly forward the packet towards the VLAN_SB.

Similarly, a northbound packet can be received at the VLAN_SB, and can be forwarded to fourth flow processing unit EP1 (South) 302-4, which processing unit can parse the packet and attempt to find a match in its flow table, wherein in case a match is found, the packet can be forwarded to security device-1 312-1 (for instance), wherein the security device-1 312-1, upon performing security operation, can return the packet to the SDN switch 310, which in turn can forward the packet to say the third flow processing unit EP2 (West) 302-3. The third flow processing unit EP2 (West) 302-3 can then forward the packet towards the VLAN_NB based on whether a match for the packet is found in its flow table. In case no match is found in the fourth flow processing unit EP1 (South) 302-4, SDN switch 310 can directly forward the packet towards the VLAN_NB.

In an exemplary implementation, SDN switch 300 can be configured to provide a four phase differential routing solution so as to provide a scalable datacenter based network security and monitoring solution. SDN switch 300 can be configured to make flow table based forwarding decisions for an original packet from the device located at the private side of SDN switch 300 or over the southbound interface. In an exemplary implementation, SDN switch 300 can remove encapsulation present (if any) on the received packets, and can also shunt the traffic to a series of security enforcement and network monitoring devices, and can further be configured with a set of devices providing Carrier Grade Network (CGN) Address Translation (NAT) function needed to ensure overall session integrity and enable reply traffic from the security devices to the SDN switch 300.

In an aspect, SDN switch 300 can be configured to provide a differential mode of routing operation in which a packet received at first flow processing unit EP 1 (North) 302-1 or at fourth flow processing unit EP 1 (South) 302-4 can be encapsulated/decapsulated with the support of an appropriate tunnel routing protocol before the packet is forwarded to a network security device. In an exemplary implementation, forwarding decisions can be made based on flow tables stored in NSP 304, wherein other operations of SDN switch 300 and flow processing units 302 can remain same as that of the transect mode described above. In an aspect, a decision for differential routing can be based on an OpenFlow Protocol action and setup in the flow tables that can be configured by SDN controller (not shown). In an aspect, system hardware configuration for the differential mode of routing can be similar to transect mode configuration with the exceptions of flow action for encapsulation/ decapsulation tunneling routing being populated in type 1 flow processing units (first set of flow processing units) such as 302-1 and 302-4.

FIG. 4A illustrates an exemplary SDN switch device 410 configured to provide transect mode of operation in accordance with an embodiment of the present disclosure. In an exemplary implementation, for enabling transect mode, also referred as Link Transection, SDN switch device 410 can be configured between two active networking devices such as network device 412-1 and network device 412-2. A first interface referred to as north (NB) bound interface (not shown) of SDN switch device 410 can be connected to the Internet or to public network, and second interface, referred to as south bound (SB) interface (not shown) of SDN switch 410 can be connected to the private network/protected devices. The link directed between these two active networking devices, 412-1 and 412-2 is said to be transected, resulting in the Internet or public side being connected to the Northbound interface of SDN switch 410, and the edge or private side being connected to the Southbound interface of SDN switch 410. SDN switch 410 can be configured to receive packets from the Internet or from public side at the Northbound interface to monitor/inspect traffic towards the private side of the network that is connected over the Southbound interface of the SDN switch. In an exemplary implementation, one or more network security devices/applications/services such as cloud based services 402, email services 404, security application 1 406, or security application 2 408, can be connected over the east or west ports (not shown) of SDN switch device 410. In an exemplary implementation, based on a flow table match, SDN switch device 410 can forward a packet received from a connected network device to an appropriate network security device/application/service.

In an aspect, SDN switch device 410 operating in transect mode can sit on a transected link between two active networking components/device such as network device 412-1 and network device 412-2, and redirect traffic-of-interest to network security devices/applications/services for inspection and/or performing security functions. In an exemplary implementation, all traffic forwarded by SDN switch device 410 to a network security device can be configured to return to SDN switch device 410. Traffic returned from network security device can be forwarded to the Northbound and/or Southbound interfaces as appropriate based on the direction of the traffic.

Generally, classifying traffic-of-interest requires consideration of two variables such as organization and network security devices. SDN switch device 410 can be configured to shunt traffic to/from a given Organization/private network to network security devices associated with that Organization and Layer 4 application type devices. This means that IP sessions/packets that originate from an Organization can be evaluated and monitored by SDN switch device 410. Similarly, all IP sessions/packets that originate externally and are directed towards an Organization can also be evaluated and monitored by SDN switch device 410 and processed by network security devices/applications/services for inspection and/or performing security functions In an exemplary implementation, depending on software configurable flow paths, packets originating from an Organization or externally originated and destined for the Organization can be conditionally forwarded to appropriate network security devices/applications/services without the potential for best-match vs. first-match IP address logic conflicts between SDN switch 410 and the network security devices attached with it.

In an exemplary implementation, SDN switch 410 can be integrated with network security devices (e.g., firewalls, gateway devices, access points, among other like network devices) to provide network security/monitoring. Active network security devices can be path associated with SDN switches so as to receive shunted traffic from the SDN switch to perform any required traffic inspection and return any forwarded traffic back to the SDN switch. It is notable that in the case of network monitoring applications, network security device may only receive a copy of the traffic without any requirement to return the traffic. In an exemplary implementation, the network security device can be configured not to alter the packet/traffic. As those skilled in the art will appreciate, network security devices can be configured to operate in a transparent Layer 2 mode of operation. In an exemplary implementation, SDN switch 410 can be configured to perform programmable flow-based shunting of traffic to the network security devices, wherein the network security devices need not be identical or uniform in nature and can be of different types. In an exemplary implementation, a first type of network security device can be path attached to SDN switch device 410 so as to receive shunted traffic from SDN switch device 410, perform any required traffic inspection, and return any forwarded traffic back to SDN switch device 410 so as to enable transect mode of operation. It is notable that in the case of network monitoring applications, the first type of network security devices may only receive a copy of the traffic without any requirement to return traffic. In an exemplary implementation, SDN switch device 410, in transect mode, can be configured to act like a Layer 2 device and perform layer-2 mode of operation, i.e., function in contrast to general devices that provide differential routing and deal with IP packets to act like a Layer 3 device. The transect mode can be used, for example, to allow deployment of scalable network-based security and monitoring solutions at any point of a network architecture.

Figure 4B:
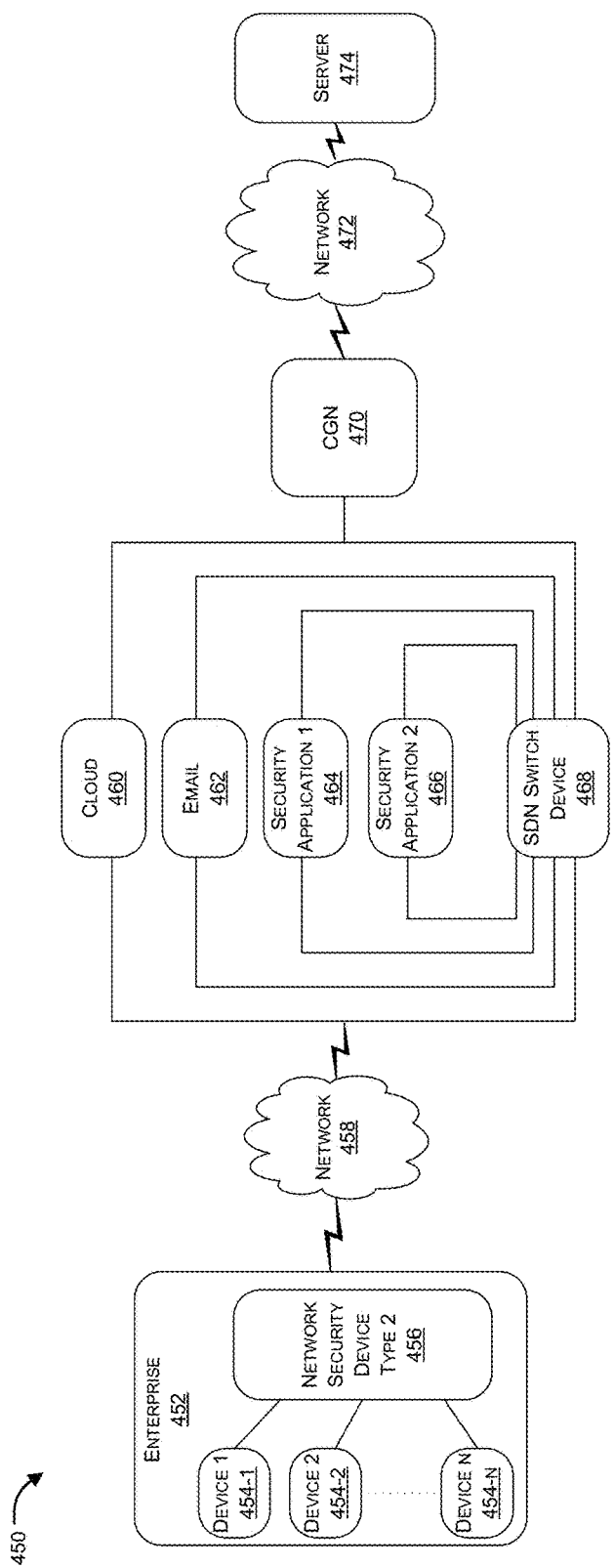

FIG. 4B illustrates an exemplary SDN switch device 468 configured to provide different forwarding modes of operation in accordance with an embodiment of the present invention. For enabling differential routing mode, encapsulation methods can be used to forward traffic via alternative paths when compared with results obtained from an IP routing table lookup based on a destination IP address of the original packet. By encapsulating the original IP packet, the packet is preserved for evaluation by subsequent network devices on alternative paths.

In an aspect, SDN switch device 468 can perform differential routing by encapsulating/decapsulating IP traffic of interest, and forwarding it to a network security device. Network security devices of type 2 456 connected at SouthBound (SB) interface of SDN switch device 468 can represent a set of functional requirements necessary to classify and forward traffic of interest to SDN switch device 468. As those skilled in the art will appreciate, network security devices 456 may not be specific products themselves, but can instead define a set of requirements imposed on existing gateway devices in making traffic forwarding decisions. For example, network security devices 456 can detect user/device/application information, and can perform policy-based traffic redirection based on those learned characteristics. However, it can be assumed that network security devices 456 will direct traffic to SDN switch device 468 based on path selection and/or traffic encapsulation to preserve original packets. Traffic from/to the network security devices to/from the SDN switch device can be termed as 'differential routing', which indicates that the traffic is being forwarded based on packet-characteristics rather than based on use of a MAC or IP forwarding table. In an exemplary implementation, CGN device 470 can be configured to act as a routing boundary between the differential routing that is employed by the solution between the network security devices and SDN switch device 468, and the traditionally routed network/Internet 472.

In another aspect, SDN switch device 468 can be configured to provide VLAN encapsulation and support non-IP packets (e.g. control messages). In an aspect, one purpose of SDN switch device 468 to operate in differential routing mode is to receive differentially routed traffic via encapsulation from network security device type 2 456 over protected network 458 that is associated with the Southbound interface, and to redirect traffic-of-interest towards the appropriate network security device/application/service for session/packet inspection. Traffic returned from network device/application/service can be forwarded to Northbound interfaces towards carrier grade network (CGN) translation device(s) 470 that are required to maintain session integrity. In an exemplary implementation, SDN switch device 468 can be configured to shunt traffic from/towards a given Organization to/from the network security devices associated with that Organization and Layer 4 application type devices. This means that IP sessions/packets that originate from an Organization can be evaluated and monitored by the SDN switch device 468. Similarly, all IP sessions/packets that originate externally and that are directed to an Organization can also be evaluated by SDN switch device 468.

In an aspect, the need to support encapsulated traffic is a critical element for differential routing functionality between network security devices that are attached with the protected network and SDN switch device 468. In one embodiment, SDN switch device 468 must be able to receive encapsulated traffic and parse the original packets contained within so that programmable flow decisions can be made based on the original packets. In an exemplary implementation, an enterprise 452 having a plurality of devices such as device 1 454-1, device 2 454-2, and device N 454-N may be connected with the network security device 456 of type 2, which can be logically be implemented with the SDN switch device 458.

In an exemplary implementation, SDN switch device 468 can be configured to support different encapsulation/decapsulation techniques/methods. In an exemplary implementation, SDN switch device 468 can be configured to support traffic encapsulation that can be internally supported in a stateless manner within an FPGA as well. In another exemplary implementation, traffic encapsulation can be supported by an external third-party device, in which case, the SDN switch device 468 can detect the encapsulation based on information contained within the outer (encapsulated) packet header, and programmatically forward that traffic to a defined external device supporting that encapsulation type. The external device can then parse the traffic and return the original packets to the SDN switch device 468. The external device may be required for encapsulation types that may not be natively supported by the SDN switch device FPGAs, especially encapsulation types requiring stateful tracking support (e.g., Internet Protocol Security IPSec)).

In an aspect, the term 'encapsulation type' is used instead of protocol to denote that multiple encapsulation protocols may be similarly accelerated by a common hardware implementation. For example IPv6 Rapid Deployment (6rd) and future MAP-T implementations for IPv6 deployment may share sufficient common functionality in how encapsulation is performed to allow grouping both protocols into a common encapsulation type. SDN switch device 468 can be configured to support different encapsulation types such as Generic Routing Encapsulation (GRE)—RFC 2784/2890, Locator/ID Separation Protocol (LISP)—RFC 6830, IPv6 Rapid Deployment on IPv4 Infrastructures (6rd)—RFC 5969.

Figure 5A:
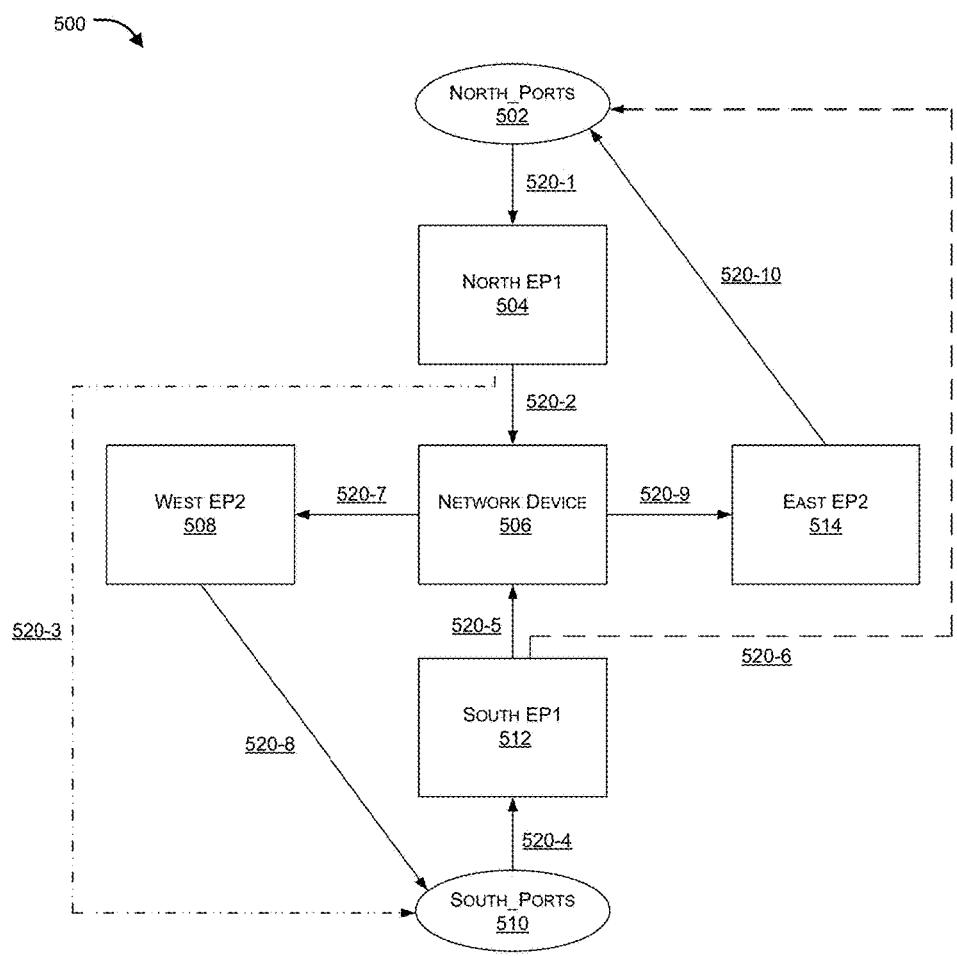
FIGS. 5A and 5B illustrate exemplary representations showing implementation of multi-mode flow processing unit based routing decisions in accordance with various embodiments of the present invention.
Figure 5B:
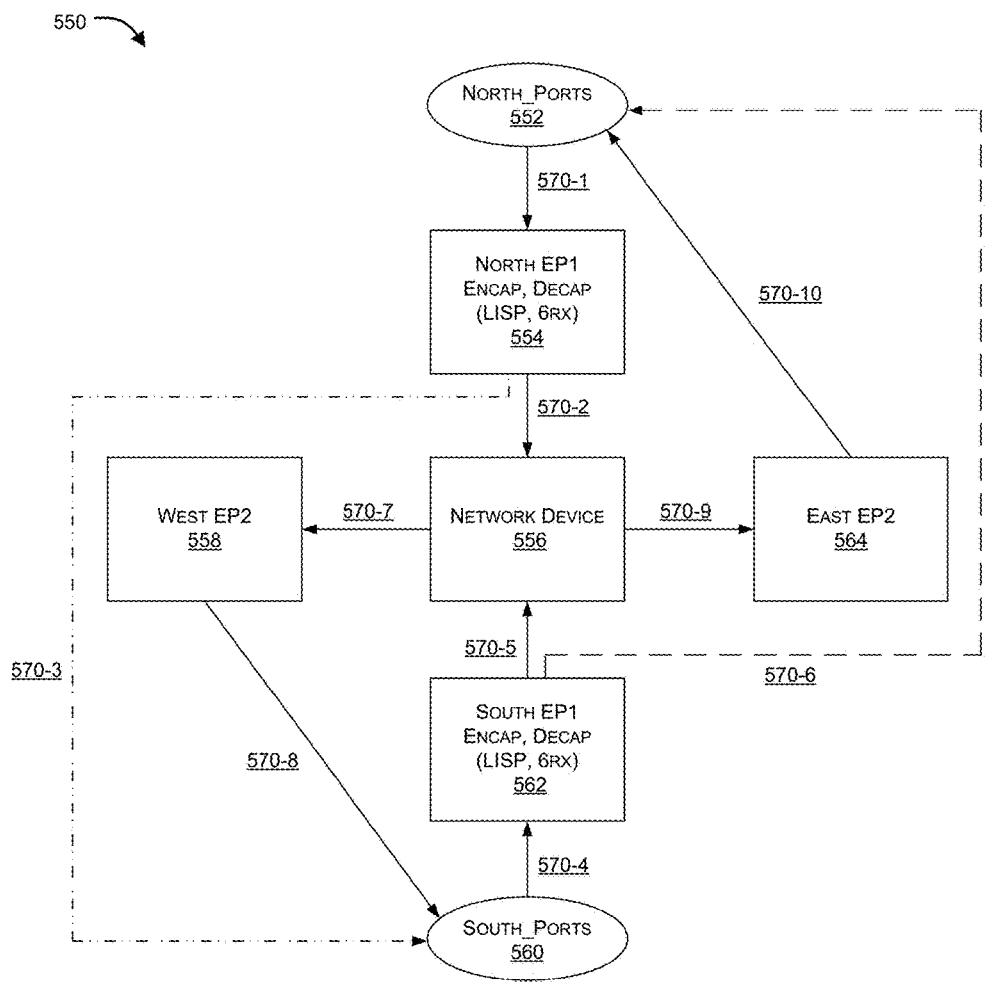

FIGS. 5A and 5B illustrate exemplary representations showing implementation of multi-mode flow processing unit based routing decisions in accordance with an embodiment of the present invention. FIG. 5A illustrates an exemplary representation 500 depicting a forwarding path in transect forwarding mode. As shown, a packet received at a North Port 502 can be forwarded (through path 520-1) to a North EP1 (first flow processing unit) 504, which can parse the packet and conduct matching with its respective flow table, wherein in case a match is found, the North EP1 504 can update its counters, execute instructions, and forward the packet (through path 520-2) to a network device 506; otherwise, the packet can be dropped or default forwarded to South Port 510 through path 520-3.

Similarly, a packet received at a South Port 510 can be forwarded (through path 520-4) to a South EP1 (second flow processing unit) 512, which can parse the packet and conduct match in its respective flow table, wherein in case a match is found, the South EP1 512 can update its counters, execute instructions, and forward the packet (through path 520-5) to the network device 506 (or any other associated network device); otherwise, the packet can be dropped or default forwarded to North Port 502 through path 520-6.

In an aspect, in case the packet is received from the network device 506 at West EP1 through path 520-7, the West EP1 (say the third flow processing unit) 508 can parse the packet and conduct a match for the same in its respective flow table, wherein in case a match is found, the counters can be updated and instructions can be executed to forward the packet to South port 510 through path 520-8, else the packet can be dropped or default forwarded to the south port 510 through path 520-8.

Similarly, in another aspect, in case the packet is received from the network device 506 at East EP2 514 through path 520-9, the East EP2 (say the fourth flow processing unit) can parse the packet and conduct a match for the same in its respective flow table, wherein in case a match is found, the counters can be updated and instructions can be executed to forward the packet to North port 502 through path 520-10, else the packet can be dropped or default forwarded to the North port 502 through path 520-10.

In an aspect, the direction from North EP1 504 to South Port 510 is transect south bound direction, and the dotted line 520-3 shows flow of packets that do not have a flow match and therefore get forwarded on the default path. Similarly, the direction from South EP1 512 to North Port 502 is transect south bound direction, and the dotted line 520-6 show flow of packets that do not have a flow match and therefore get forwarded on the default path.

FIG. 5B illustrates an exemplary representation 550 depicting forwarding path in a differential routing mode. As shown, a packet received at a North Port 552 can be forwarded (through path 570-1) to a North EP1 (first flow processing unit) 554, which can encapsulate/decapsulate the packet, and conduct match in its respective flow table, wherein in case a match is found, the North EP1 554 can update its counters, execute instructions, and forward the packet (through path 570-2) to a network device 556, else the packet can be dropped or default forwarded to South Port 560 through path 570-3.

Similarly, a packet received at a South Port 560 can be forwarded (through path 570-4) to a South EP1 (second flow processing unit) 562, which can encapsulate/decapsulate the packet and conduct match in its respective flow table, wherein in case a match is found, the South EP1 562 can update its counters, execute instructions, and forward the packet (through path 570-5) to the network device 556 (or any other associated network device), else the packet can be dropped or default forwarded to North Port 552 through path 570-6.

In an aspect, in case the packet is received from the network device 556 at West EP1 through path 570-7, the West EP1 (say the third flow processing unit) 558 can parse the packet and conduct a match for the same in its respective flow table, wherein in case a match is found, the counters can be updated and instructions can be executed to forward the packet to South port 560 through path 570-8, else the packet can be dropped or default forwarded to the south port 560 through path 570-8.

Similarly, in another aspect, in case the packet is received from the network device 556 at East EP2 564 through path 570-9, the East EP2 (say the fourth flow processing unit) can parse the packet and conduct a match for the same in its respective flow table, wherein in case a match is found, the counters can be updated and instructions can be executed to forward the packet to North port 552 through path 570-10, else the packet can be dropped or default forwarded to the North port 502 through path 570-10.

In an aspect, the direction from North EP1 554 to South Port 560 is transect south bound direction, and the dotted line 570-3 shows flow of packets that do not have a flow match and therefore get forwarded on default path. Similarly, the direction from South EP1 562 to North Port 552 is transect south bound direction, and the dotted line 570-6 shows flow of packets that do not have a flow match and therefore get forwarded on default path.

Figure 6:
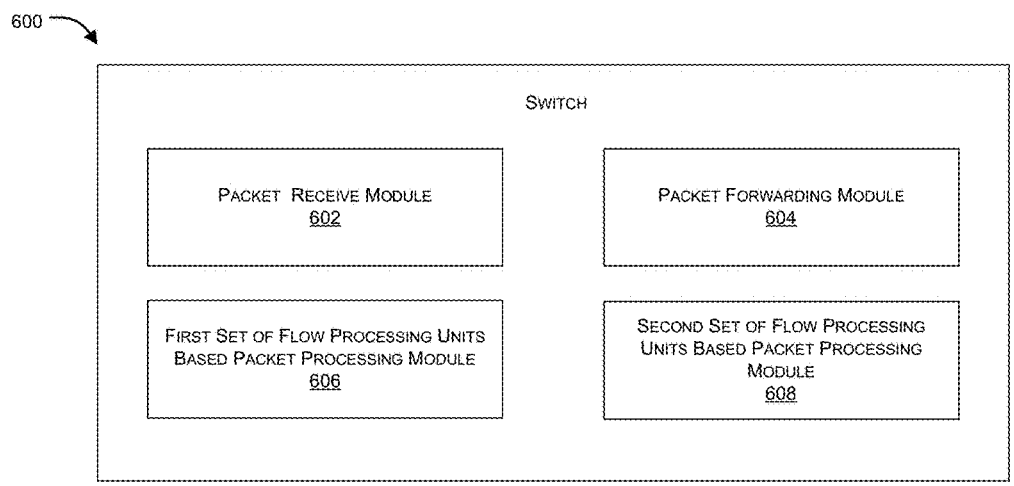
FIG. 6 illustrates an exemplary functional module diagram of an SDN switch that provides multi-mode flow processing unit based routing decisions in accordance with an embodiment of the present invention.

FIG. 6 illustrates an exemplary functional module diagram of an SDN switch 600 that provides multi-mode flow processing unit based routing decisions in accordance with an embodiment of the present invention. In the context of the present example, SDN switch 600 includes a packet receive module 602 configured to receive a packet at an input port, wherein the SDN switch can include a first set of flow processing units and a second set of flow processing units. SDN switch 600 further includes a packet forwarding module 604 configured to forward the received packet to a first flow processing unit selected from the first set of flow processing units. SDN switch 600 further includes a first set of flow processing units based packet processing module 606 configured to based on matching of the packet with respect to a flow table of the first flow processing unit, decide whether to forward the packet to a network device or to forward the packet to an output port. SDN switch 600 also includes a second set of flow processing units based packet processing module 608 configured to receive the packet at a second flow processing unit that is selected from the second set of flow processing units and, based on matching of the packet with respect to flow table of the second flow processing unit, decide whether to execute one or more instructions to forward the packet to the input/output port, or to drop/default forward the packet to the input/output port.

In an aspect, the second flow processing unit can receive the packet from the network device, and wherein the network device can include one or a combination of a network security device, a network application device, a web server, an email server, a gateway device, a controller, an access point and a network level appliance.

In another aspect, the first set of flow processing units can include the first flow processing unit that can be configured to receive packets that arrive at northbound (NB) ports, and a third flow processing unit that can be configured at receive packets that arrive at southbound (SB) ports.

In another aspect, the second set of flow processing units can include the second flow processing unit that can be configured to receive packets that arrive at eastbound ports, and a fourth flow processing unit that can be configured to receive packets that arrive at westbound ports.

In another aspect, the first flow processing unit can parse the packet received from the northbound (NB) port, and based on matching of the packet with respect to flow table of the first flow processing unit, either forward the packet to the network device if a match is found, else drop or default forward the packet to southbound (SB) port, wherein NB port is the input port and SB port is the output port. Similarly, the third flow processing unit can parse the packet received from the southbound (SB) port, and based on matching of the packet with respect to respective flow table, either forward the packet to a network device if a match is found, else drop or default forward the packet at northbound (NB) port, wherein SB port is the input port and NB port is the output port.

In another aspect, the second flow processing unit can parse the packet received from the network device, and based on matching of the packet with respect to the flow table of the second flow processing unit, either execute the one or more instructions if a match is found, else drop or default forward the packet to the southbound (SB) port. Similarly, the fourth flow processing unit can parse the packet received from the network device, and based on matching of the packet with respect to flow table of the fourth flow processing unit, either execute the one or more instructions if a match is found, else drop or default forward the packet to the northbound (NB) port.

In another aspect, at least one flow processing unit, upon finding a match in respective flow table, updates its counters and/or executed one or more configured instructions.

In another aspect, in the differential routing mode, the first set of flow processing units can encapsulate/decapsulate the received packet based on one or more tunneling protocols, wherein the encapsulated/decapsulated packet can be forwarded to the network device. In an aspect, the decision of encapsulation/decapsulation can be taken based on open flow action that can be configured by SDN controller in the flow table of the respective flow processing unit of the first set of flow processing units.

Figure 7:
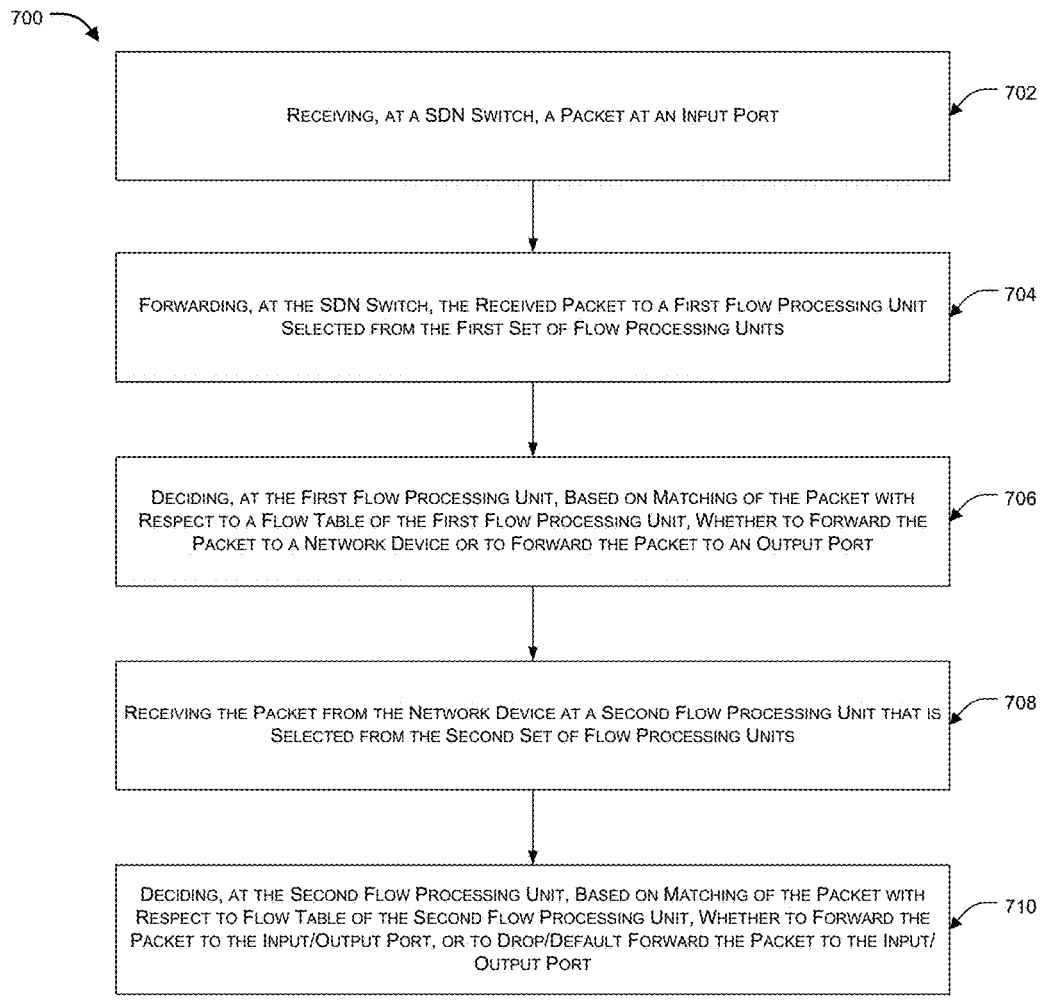
FIG. 7 illustrates an exemplary flow diagram of a method showing implementation of multi-mode flow processing unit based routing decisions in accordance with an embodiment of the present invention.

FIG. 7 illustrates an exemplary flow diagram 700 of a method showing implementation of multi-mode flow processing unit based routing decisions in accordance with an embodiment of the present invention. In an aspect, the method can include, at step 702, receiving, at an SDN switch, a packet at an input port, wherein the SDN switch comprises a first set of flow processing units and a second set of flow processing units, and at step 704, forwarding, at the SDN switch, the received packet to a first flow processing unit selected from the first set of flow processing units. The method can further include, at step 706, deciding, at the first flow processing unit, based on matching of the packet with respect to a flow table of the first flow processing unit, whether to forward the packet to a network device or to forward the packet to an output port. The method can further include, at step 708, receiving the packet from the network device at a second flow processing unit that is selected from the second set of flow processing units, and at step 710, deciding, at the second flow processing unit, based on matching of the packet with respect to flow table of the second flow processing unit, whether to execute one or more instructions to forward the packet to the input/output port, or to drop/default forward the packet to the input/output port.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method of processing packets received by a by a software defined networking (SDN) switch, wherein the SDN switch includes a northbound interface coupled to a public network, a southbound interface coupled to a private network, a westbound interface and an eastbound interface coupled to a plurality of network security devices protecting the private network and a plurality of flow processing units (FPUs), the method comprising:
   receiving, by the SDN switch, a packet via an input port of the northbound interface;
   forwarding, by the SDN switch, the packet to a first FPU selected from a first set of hardware-based FPUs of the plurality of FPUs, wherein the first set of hardware-based FPUs are of a first type that are configured to forward packets received from the northbound interface to the private network via the southbound interface or to one of the plurality of network security devices via the westbound interface or the eastbound interface;
   determining, by the first FPU, whether to cause security scanning to be performed on the packet or to forward the packet to the private network via the southbound interface by obtaining a first forwarding decision regarding the packet by matching one or more portions of the packet against a first flow table associated with the first FPU;
   when the first forwarding decision specifies the security scanning is to be performed on the packet, then:
      forwarding, by the first FPU, the packet to a network security device of the plurality of network security devices via the westbound interface or the eastbound interface;
      after the packet has been security scanned by the network security device, receiving the packet from the network security device by a second FPU that is selected from a second set of hardware-based FPUs of the plurality of FPUs, wherein the second set of hardware-based FPUs are of a second type that are configured to forward packets received on the westbound interface or the eastbound interface to the private network via the southbound interface or to drop the packets; and
      determining, by the second FPU, whether to drop the packet or to forward the packet to the private network via southbound interface by obtaining a second forwarding decision regarding the packet by matching the one or more portions of the packet against a second flow table associated with the second FPU; and
   when the first forwarding decision specifies the packet is to be forwarded to the private network, then forwarding, by the first FPU, the packet via an output port of the southbound interface.

2. The method of claim 1, wherein the plurality of FPUs comprise Field-Programmable Gate Arrays (FPGAs).

3. The SDN switch of claim 2, wherein the encapsulation is determined based on an OpenFlow Protocol action that is configured within the first flow table by an SDN controller associated with the SDN switch.

4. The method of claim 2, wherein the plurality of network security devices comprise one or more of a Distributed Denial of Server (DDoS) protection system, an intrusion protection system and a firewall.

5. The method of claim 1, wherein when the first set of hardware-based FPUs are configured to operate in a differential routing mode, then the method further comprises performing, by the first FPU, an encapsulation on the packet based on a tunneling protocol prior to forwarding the packet to the network security device.

6. A software defined networking (SDN) switch comprising:
   a northbound interface coupled to a public network;
   a southbound interface coupled to a private network;
   a westbound interface and an eastbound interface coupled to a plurality of network security devices protecting the private network;
   a plurality of flow processing units (FPUs), wherein the plurality of FPUs include a first set of hardware-based FPUs of a first type and a second set of hardware-based FPUs of a second type;

a switch fabric coupled to the northbound interface, the southbound interface, the westbound interface, the eastbound interface and the plurality of FPUs, wherein packets received via the northbound interface are directed to FPUs within the first set of hardware-based FPUs, wherein packets processed by one of the plurality of network security devices and received via the westbound interface or the eastbound interface are directed to FPUs within the second set of hardware-based FPUs;

wherein responsive to receipt of a packet by a first FPU of the first set of hardware-based FPUs, the first FPU determines whether to forward the packet to a network security device of the plurality of network security devices for security scanning or to forward the packet to the private network via the southbound interface by obtaining a first forwarding decision regarding the packet by matching one or more portions of the packet against a first flow table associated with the first FPU; and wherein responsive to receipt of the packet by a second FPU of the second set of hardware-based FPUs after security scanning of the packet has been performed by the network security device, the second FPU determines whether to forward the packet to the private network via the southbound interface or to drop the packet by obtaining a second forwarding decision regarding the packet by matching the one or more portions of the packet against a second flow table associated with the second FPU.

7. The SDN switch of claim 6, wherein the plurality of FPUs comprise Field-Programmable Gate Arrays (FPGAs).

8. The SDN switch of claim 6, wherein when the first set of hardware-based FPUs are configured to operate in a differential routing mode, then the first FPU performs an encapsulation on the packet based on a tunneling protocol prior to forwarding the packet to the network security device.

9. The SDN switch of claim 8, wherein the encapsulation is determined based on an OpenFlow Protocol action that is configured within the first flow table by an SDN controller associated with the SDN switch.

10. The SDN switch of claim 6, wherein the plurality of network security devices comprise one or more of a Distributed Denial of Server (DDoS) protection system, an intrusion protection system and a firewall.

* * * * *